Figure 1:
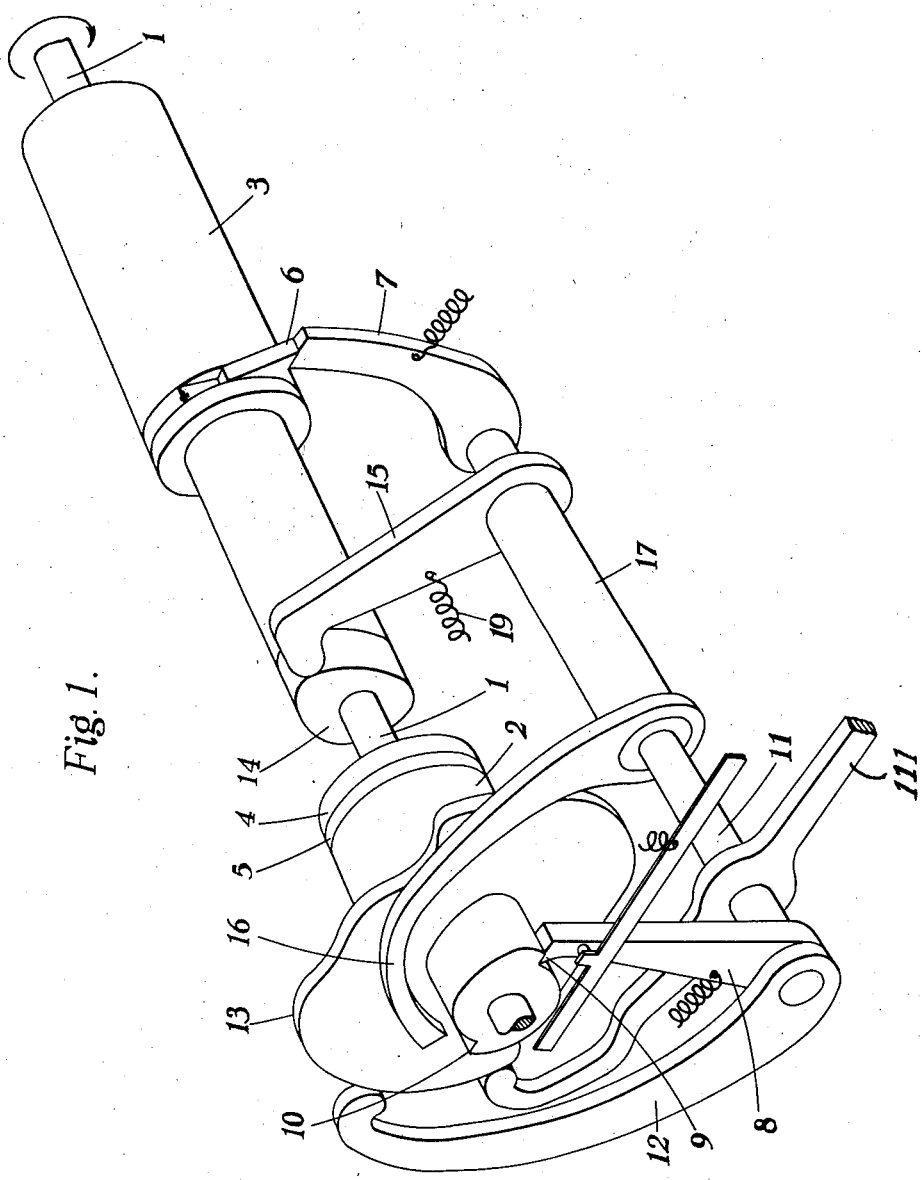

Aug. 29, 1933.  R. G. GRIFFITH  1,924,357
START-STOP TELEGRAPH SYSTEM AND APPARATUS
Filed April 30, 1932  4 Sheets-Sheet 1

INVENTOR
RONALD G. GRIFFITH
BY *RC Hopgood*
ATTORNEY

Aug. 29, 1933.  R. G. GRIFFITH  1,924,357
START-STOP TELEGRAPH SYSTEM AND APPARATUS
Filed April 30, 1932    4 Sheets-Sheet 3

INVENTOR
RONALD G. GRIFFITH
BY R C Hopgood
ATTORNEY

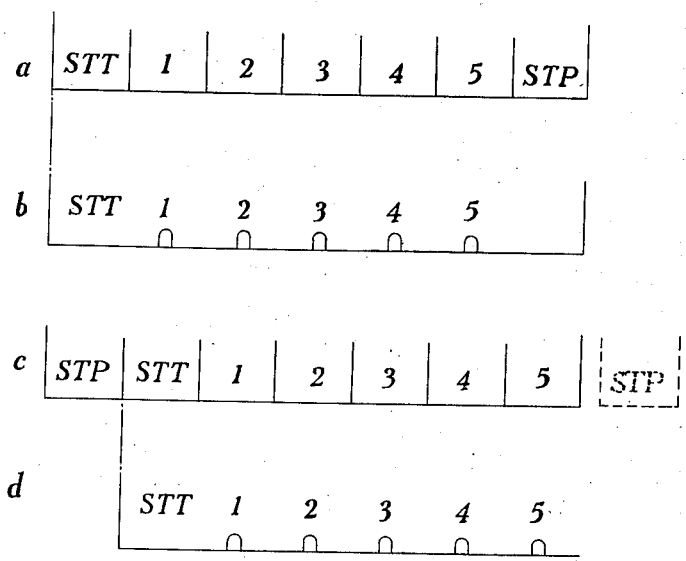

Patented Aug. 29, 1933

1,924,357

UNITED STATES PATENT OFFICE 1,924,357

START-STOP TELEGRAPH SYSTEM AND APPARATUS

Ronald George Griffith, Croydon, England, assignor to Creed and Company, Limited, Croydon, England Application April 30, 1932, Serial No. 608,407, and in Great Britain March 4, 1932

20 Claims. (Cl. 178—17)

This invention relates to printing telegraph systems and apparatus, and refers more particularly to translating or selecting mechanism employed in signal transmitting and receiving apparatus in systems operating on the start-stop principle.

According to the start-stop code a signal combination consists of an invariable start element, followed by a definite number of variable permutation elements, and terminated by a stop element of opposite character to that of the start element. In signal transmitting and signal receiving apparatus in telegraph systems operating according to this code it is usual to arrange for cam means to be power driven through a predetermined angle or degree of rotation, usually a half of one revolution, for each signal combination and to effect during that rotation a series of operations in accordance with the permutation elements of the signal for the actuation of the translating or selecting mechanism. In both transmitting and receiving apparatus, however, it is necessary to effect various subsidiary operations either prior to or following the transmission or reception of the permutation elements of the signal and, in general, it may be stated that these subsidiary operations are effected during periods corresponding to the invariable start and stop elements of a signal.

A main object of the present invention is to provide greater facilities for effecting the subsidiary operations and according to a main feature of the invention this object is achieved by an improved method of controlling the rotation of the operating cam means by the provision of separate cam means for this purpose.

Another object of the invention which object is readily attained by the means outlined above, is to provide a brief minimum interval between successive signal combinations as transmitted, which is sometimes desirable with very rapid operation of the keys in the keyboard in order to ensure completion of each successive movement of the coacting operating cam means in the signal receiving apparatus.

In the detailed description hereinafter given, a keyboard controlled transmitting apparatus similar to that shown in the specification of my U. S. Letters Patent No. 1,921,407 and employing the method of control according to the present invention is referred to as illustrating an instance which this method is particularly advantageous. Similar advantages, but in this case preferably at a different period in the cycles of operation, can be obtained in signal receiving apparatus.

A further feature hereinafter described consists of a novel disposition of the start stop and permutation elements in the start-stop code and the mode and sequence of operations in coacting transmitting and receiving apparatus. As will be seen, this feature may be employed either separately or in conjunction with the other features of the invention.

Figure 2:
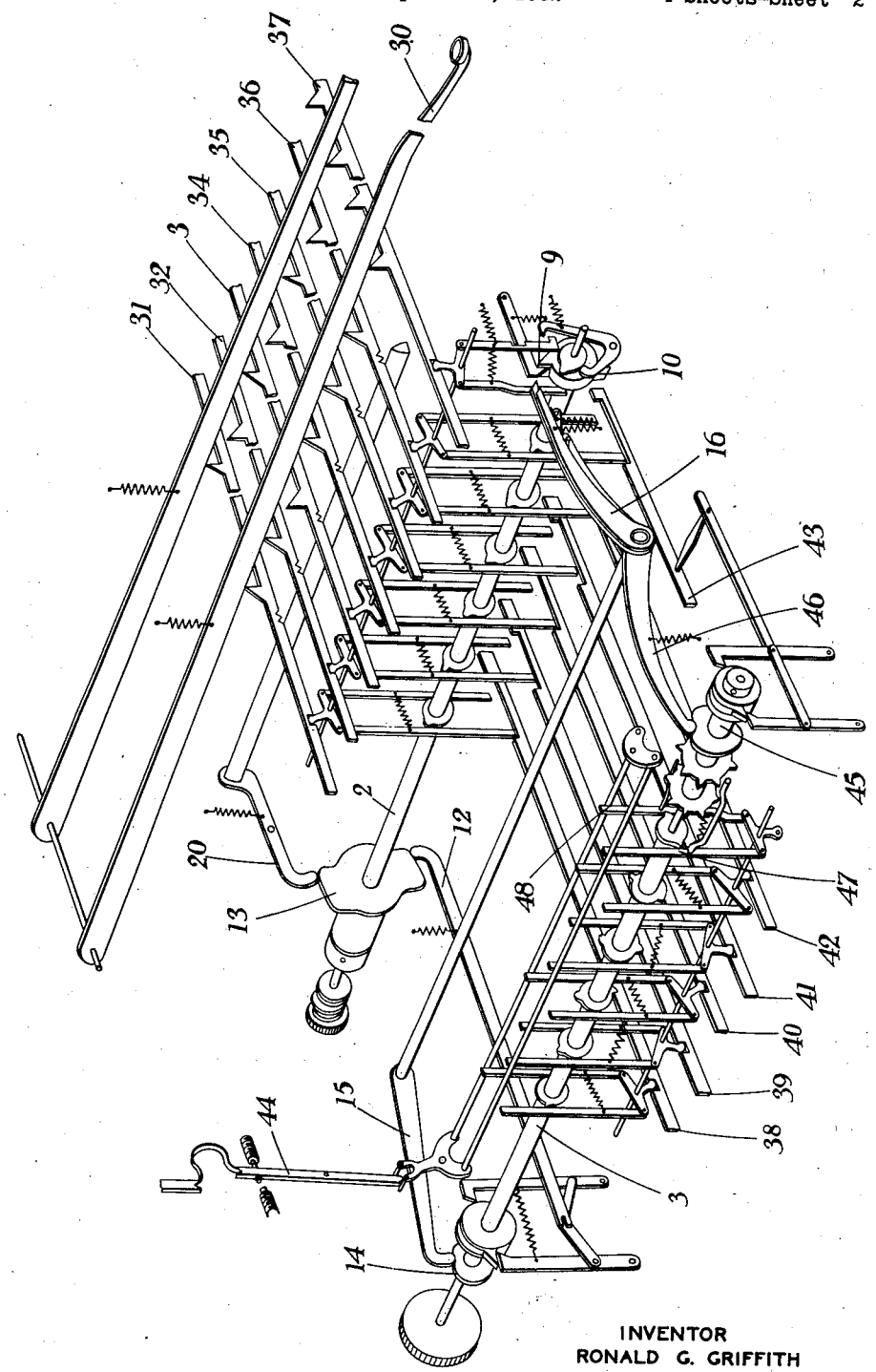
Figure 3:
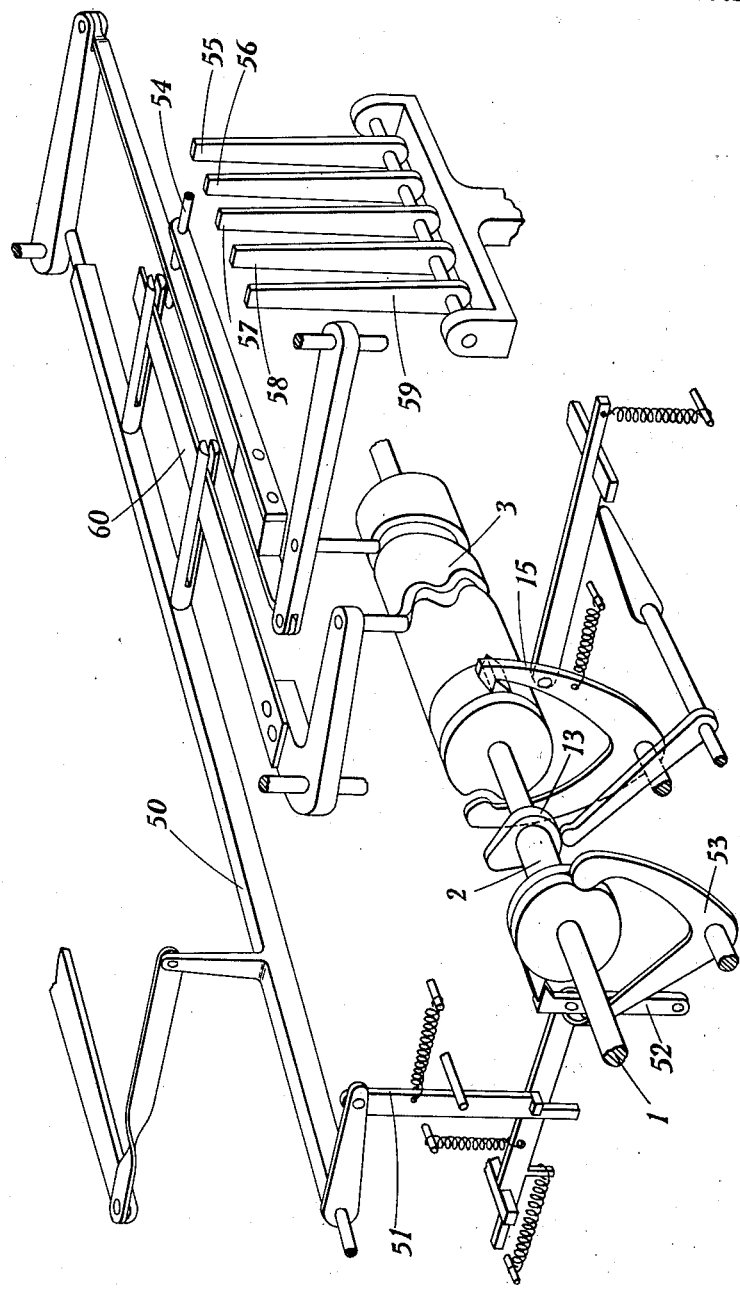

In the accompanying drawings Fig. 1 shows a perspective view of the clutches and contact mechanism of the cam means in a start-stop signal transmitter, Fig. 2 is a perspective view of the keyboard controlled transmitter of the co-pending application previously referred to, Fig. 3 shows the application of the invention to a start-stop receiving apparatus, whilst Fig. 4 is a diagram for illustrating the feature relating to the disposition of the elements in a signal combination.

Referring to Fig. 1, a power shaft 1 is arranged to be driven continuously by suitable motor means (not shown). On this shaft 1 are arranged two independently rotatable cam sleeves 2 and 3, each sleeve having independent clutch means for coupling the sleeve to the common power shaft. In the drawings, for a purpose which will be referred to later, the clutch for driving sleeve 2 is constituted by a friction drive consisting of a driving disc 4 fixed to shaft 1, and a disc of friction material 5 interposed under pressure between disc 4 and a corresponding driving face of sleeve 2. Sleeve 3 is rotated from shaft 1 by a toothed clutch having an engaging detent or tooth 6 adapted to be arrested, in this case at each revolution, by an arm 7. The rotation of sleeve 2 is controlled by a controlling arm 8 preferably arranged to permit rotation of a half revolution at each actuation by engaging with one or the other of two teeth 9 and 10 diametrically disposed on the sleeve. It will be understood, however, that the precise manner of clutching each of the two sleeves to the shaft and the predetermined degree of rotation of each sleeve at each release is of no particular importance for the present invention, the particulars given being for illustrative purposes only.

The arm 8 is actuated in any convenient manner from the keyboard of the apparatus (not shown) to release sleeve 2 for a half revolution at each actuation, the arms shown loosely pivoting on a spindle 11 which spindle in this means shown is also employed to actuate arm 7 by cam arm 12. Arms 7 and 12 are both fixed to spindle 11 but the remaining arms and sleeve shown thereon in the drawing are loosely mounted and derive no motion from the spindle. A cam 13 having a similar contour for actuating cam arm 12 at each half revolution of sleeve 2 has raised concentric portions in the resting positions of the sleeve with arm 8 engaging tooth 9 or 10, with cut away portions for permitting cam arm 12 to drop and actuate arm 7 to a position, to release clutch tooth 6 a predetermined interval after the actuation of controlling arm 8 and the release of sleeve 2, arm 8 being returned during rotation of sleeve 2 to rearrest the sleeve after a half-revolution and arm 7 being returned near completion of this half-revolution to rearrest sleeve 3 on completion of a whole revolution thereof.

Sleeve 3 is arranged to effect during its rotation the transmission of the series of signal elements for each combination by any means already well known in the art and therefore not further illustrated with reference to this figure. Figure 2 to which further reference will later be made shows an example of the manner in which the elements of a signal can be determined by the depression of a character key in a keyboard. In order, however, to provide a minimum delay period following the transmission of one signal combination before a further signal can be transmitted, means is provided controlled by sleeve 3 to intercept the rotation of sleeve 2 during a subsequent half-revolution so as to ensure a minimum period before sleeve 3 can be again released. For this purpose a cam 14 is fixed to sleeve 3 and co-operates with a lever 15 which is coaxially fixed to an intercepting lever 16 by means of a bush 17 loosely pivoting on spindle 11. A spring 19 holds lever 15 against cam 14 which is contoured so as to actuate intercepting lever 16 to a position clear of teeth 9 and 10 on sleeve 2 at or near the rest position of sleeve 3. At other positions during rotation of sleeve 3, cam 14 permits intercepting lever 16 to drop to a position to intercept tooth 9 or 10. If arm 8 is now actuated to release sleeve 2 for a further half-revolution, the sleeve commences rotation, arm 8 thereafter riding on the high portion of the tooth and not affecting this movement until the half revolution is completed, but shortly after and before cam lever 12 drops from the raised portion of cam 12 to actuate arm 7, further rotation of sleeve 2, is prevented by intercepting lever 16 engaging a tooth 9 or 10. This is thereupon held until sleeve 3 has substantially completed its revolution when the intercepting lever 16 will be raised by cam 14, sleeve 2 continues its rotation and lever 12 will drop after a further portion of a revolution from the high portion of cam 13 and effect the release of sleeve 3 for a further revolution.

A locking lever 111, also loosely pivoting on spindle 11 is shown in Fig. 1 with its extremity bearing on cam 13. This lever is employed to effect the locking of the keys in the keyboard. As soon as cam 13 on sleeve 2 commences rotation lever 20 drops and locks the combination set up in a series of permutation members by the depressed key in the keyboard. This combination is transferred to the setting of a further series of members and the lever 20 is actuated to its normal position to the keyboard before the half revolution of sleeve 2 is completed. The position of lever 20 with respect to cam 13 is arranged to effect locking before the position of sleeve 2 is reached at which intercepting lever 16 can delay further rotation of the sleeve and this latter position as above described, is arranged prior to the position at which sleeve 3 is released for rotation.

The method of operation of the arrangement above described, in a keyboard controlled transmitter, is as follows. On depression of a character key in the keyboard, controlling arm 8 is actuated to release cam sleeve 2 which is frictionally driven by clutch members 4 and 5 from shaft 1. Locking lever 20 falls and locks the keyboard as soon as cam 13 commences to rotate after cam 13 has rotated through a definite angle during which period other subordinate operations such as setting up on transfer of the signalling combination can be effected. Cam lever 12 falls and effects the release of cam sleeve 3 which controls transmitting signal contacts in the usual manner. Normally, after rotation for half a revolution sleeve 2 is rearrested by arm 8 in preparation for a further signal combination. If arm 8 is again actuated before sleeve 3 has completed its rotation, sleeve 2 is intercepted by interrupting arms 16 as soon as lever 20 has locked the keyboard for the second signal. As soon as the previous signal has been completed by sleeve 3, cam 14 effects the release of sleeve 2 and a further series of operations for the second signal combination as for the first, but as cam 13 is required to rotate through a definite angle before sleeve 2 is again released following the completion of its previous revolution, a definite minimum interval is ensured between successive signal combinations and this result is obtained without unduly impeding the operation of the keyboard.

If desired, cam 13 can be arranged to be adjustable on sleeve 2 so as to provide a means of varying the period which elapses before sleeve 3 is released. An advantage in providing a friction clutch for driving sleeve 2 instead of a toothed clutch, however, will now be seen to consist of the lengthening of this period with higher signalling speeds when it is desirable that a slightly longer minimum interval should elapse between successive signals. At the higher rotational speeds of shaft 1 a slightly longer proportionate period will elapse after the release of sleeve 2 before the sleeve has attained its maximum velocity towards its next position. With a toothed or other positive drive, however, this would not occur.

Fig. 2 shows an example of a keyboard controlled transmitter in which important advantages are obtained by the method of control of the signalling cam means according to the present invention. As previously mentioned, this drawing is similar to that shown in U. S. Letters Patent No. 1,921,407, and reference may be hereby directed to that specification for a more complete explanation of the mechanism shown in this Fig. 2. A brief summary of the features so far as related to the present invention will here be given but it should be noted that the reference numbers now given are for purposes of the present explanation and do not correspond with those in the original drawings; similar reference numbers, however are used for parts corresponding to Fig. 1 of the present case.

In Fig. 2, the two cam sleeves 2 and 3 are mounted on separate driving shafts which are both geared to common motor means (not shown). Sleeve 2 carries cam 13 which actuates locking lever 20 and clutch controlling arms of sleeve 3 through lever 12. Sleeves 2 and 3 in this case both rotate for a half revolution at each actuation at appropriate speeds as determined by the gear means employed. An intercepting lever 16 engages in its actuated position tooth 9 or 10 of the clutch of sleeve 2 and is controlled by lever 15 cooperating with a cam 14 on sleeve 3 as before. The main purpose of the whole arrangement shown in the figure, however, is that of automatically inserting an appropriate case-shift signal combination on depression of a key lever on a change of case. Briefly described the mode of operation is as follows. Depression of a key lever 30 sets a series of permutation bars 31—35, a case determining bar 36 and an universal bar 37. The universal bar effects the release of cam sleeve 2 for half a revolution whereupon the combination set up by the keyboard is locked, by lever 20 and the setting of permutation bars 31—35 transferred simultaneously to bars 38—42 and 43 by cams on sleeve 2. If bar 43 remains in its previous position which will be the case of a character in the same case group as the previous signal, the main signalling cam sleeve 3 is released and actuates the signal transmitting contact lever 44 in accordance with the setting of the series of bars 38—42. If however bar 43 is actuated to its opposite position following depression of a character key in the opposite case group, a separate case signalling cam sleeve 45 is released for half a revolution, and code projections arranged on the sleeve actuate the transmitting contact lever 44 in accordance with the elements of the appropriate case signal whilst further rotation of sleeve 2 is arrested by intercepting lever 16, in this instance actuated by an arm 46 cooperating with a cam on sleeve 45 similar to cam 14 on sleeve 3. As soon as the transmission of the case signal is completed arm 46 drops and sleeve 2 then completes its rotation and effects the transmission of the signal combination corresponding to the key depressed.

It will thus be seen that the provision of the separate cam sleeve 2 which releases the main signalling cam sleeve subsequent to its even release affords a longer period of time in which the various operations such as setting up and transferring a signal combination to various series of numbers before the transmission of the first permutation element of a signal, can be effected in addition to the provision of a minimum compulsory time interval between successive signal combinations if desired as previously described herein. This longer period for preliminary operations is of particular value for the purposes of the arrangement shown in Fig. 2 wherein it is necessary to determine automatically whether a case signal is to be inserted or not and to effect operations accordingly.

Fig. 3 shows the application of the method of control according to the invention to the selecting mechanism of a start-stop receiving apparatus but as certain parts of the means here shown are already known in the art only a brief description will be given for illustrating the particular features of interest in the present connection. A signal receiving relay actuates a rockshaft 50 between one and the other of two positions in accordance with received signal elements, which rockshaft effects the release of clutch mechanism on receipt of a starting impulse of a signal combination and thereafter controls the actuation of a series of permutation members in accordance with corresponding permutation elements in the signal. The actuation of rockshaft 50 in response to the starting impulse depresses an arm 51 which unlatches a clutch controlling arm 52. A cam sleeve 2 is thereupon driven by a driving shaft 1 and immediately upon rotation effects the return of the clutch controlling arm to a position beyond the relatching position by a doublearmed lever 53 in a manner already known. A cam 13 on sleeve 2 effects after a predetermined portion of a revolution the release of a main cam sleeve 3 in this case if desired by unlatching a second clutch controlling arm 15. The main cam sleeve 3 is thereupon clutched to the driving shaft 1 and during rotation moves a striker pin 54 opposite each of a series of permutation member actuators 55—59 in turn whilst a striker blade 60 guided to a position either in time or out of time with pin 54 in accordance with the character of each element of the signal is reciprocated by a cam on sleeve 2 to strike or miss each actuator 55—59 through pin 54 in synchronism with the permutation elements of the signal combination. The actuators 55—59 control the selection of a printing character in any manner already well known.

By means of the two separate cam sleeves in the selecting or translating mechanism of a receiving apparatus of this nature the various operations performed by the main cam sleeve 2 during its revolution can be arranged to provide a longer period after the setting of the actuators 55—59 for any desired subsequent operations such as transfer or printing to be effected during the completion of revolution of sleeve 3 whilst sleeve 2 is in a condition to be released in preparation for a subsequent signal combination. It should be noted that this arrangement is distinct from known arrangements in start stop receiving apparatus where a second cam sleeve for effecting such as printing and feeding operation is released at or near completion of a first cam sleeve which has effected the operation of the translating mechanism. If desired, however, a further division of the sequence of operations in the receiving apparatus could be achieved by employing the known arrangements in conjunction with that of the present invention.

Fig. 4 illustrates a method of operating a start-stop telegraph system which affords further advantages similar to that of the method of control of the clutch means as above described and may be employed either separately or in conjunction therewith. As will be seen this is of particular interest in connection with the keyboard controlled transmitting arrangement shown in Fig. 2. In order to comprehend this method it is useful to recall that a signal combination as transmitted according to the start stop code normally comprises an invariable start element followed by a definite number of variable permutation elements usually five, and concluded by an invariable stop element which is of an opposite character to that of the start element. The starting element effects the release of cam means in the distant receiving apparatus, the permutation elements control the setting of a corresponding series of permutation members in the receiving translating mechanism for the selection of a printing character or other selectable operation, and the stop element may be said to prevent any possibility of the last permutation element of a signal merging with the start element of a succeeding signal if the last permutation element is of the same polarity or character. The stop impulse being invariably of an opposite character to that of the starting element, the receiving cam means is thereby adapted to be released more positively in response to each received starting element of the signal combinations. This method of operation is illustrated diagrammatically in sections $a$ and $b$ of Fig. 4 in which section $a$ represents the disposition of the elements a complete signal code combination of seven elements as transmitted, the first, STT representing the start element followed by five permutation elements numbered one to five consecutively and a concluding stop element STP. Section $b$ represents the sequence of operations of the coacting receiving apparatus, the operating cam sleeve for convenience being represented as released simultaneously with the commencement of the start element of the received signal the permutation member actuators being selectively actuated in sequence in synchronism with the middle portions of the received permutation elements 1—5, and transfer or printing operations being effected during receipt of the stop element whilst the receiving relay returns to its normal position in preparation for a further start element, the operating cam sleeve completing its revolution at the completion of the received signal combination substantially as shown.

Sections $c$ and $d$ of Fig. 4 show the modified method of the known arrangement just described and consists of transposing the stop element from the end of a signal combination to the commencement when it precedes the invariable start element of opposite character and the following permutation elements. In this case it is necessary to arrange for the cam sleeve of the receiving apparatus to be invariably arrested after the completion of its cycle of operations and independently of the condition of the receiving relay at that instant. This is readily effected by providing any of the well known one-revolution clutch mechanisms or other means effecting rotation through a given angle at each actuation, for driving the operating cam sleeve or the separate controlling sleeve. In section $c$ of Fig. 4, for instance, the two invariable stop and start elements of opposite character are represented by STP and STT respectively, followed by the five permutation elements of the signal, which then terminates. In the receiving apparatus the operating cam mechanism is unresponsive to the first stop element but is released in response to the second or start element of the received signal as indicated by the offset displacement of section $d$ with respect to section $c$. As in the known arrangement, the last portion of the revolution of the receiver cam means corresponds to the stop element of the signal and in this case may be completed whilst a stop element, i. e. the first element of a succeeding signal is being transmitted.

From this it will be seen that the same security of operation due to the use of a stop element for separating the start element from any permutation elements but an additional period of time equal to the length of this stop element is provided at the commencement of a transmitted signal in which various preliminary operations can be effected prior to the transmission of any permutation elements of a signal. In the arrangement shown in Fig. 2 for instance this can be of particular importance.

The modified arrangement of the signal controlling means in a start-stop transmitting apparatus for providing the feature above described will vary in accordance with the actual type of transmitting mechanism involved. The principle however is the same for all the known transmitters arranged to transmit code combinations composed of a start element, a series of permutation elements, and terminated by a stop element. This principle, as will be readily understood from a reference to Fig. 2, consists of arranging the operating cams on sleeve 3 so that levers 47 and 48 are invariably actuated in succession at the commencement of rotation of sleeve 8 and one or the other of the five pairs of levers are actuated in succession during the remainder of each half revolution of the cam sleeve which is thereupon rearrested upon termination of the fifth permutation elements.

The foregoing description of the features of the invention and the manner of application in different cases is not intended to be construed in a limitative sense. It has been indicated in places where known arrangements have been described and where other alternatives are possible but in all instances it is intended that the scope of the invention should be indicated more precisely by the appended claims.

What is claimed is:

1. In a translating or selecting mechanism for start-stop apparatus, a continuously rotatable driving means, operating cam means, a clutch therefor, and separate cam means effecting the release of said clutch after a predetermined portion of a revolution.

2. In a transmitting or selecting mechanism for start-stop telegraph apparatus, continuously rotatable driving means, operating cam means, a clutch therefor, separate cam means released at the commencement of each signal, and an arm actuated by said separate cam means and controlling said clutch.

3. In a transmitting or selecting mechanism for start-stop telegraph apparatus, common driving means, independent operating and controlling cam sleeves, independent clutch means for each sleeve and adapted to effect rotation for a predetermined amount, said controlling cam sleeve completing its movement in a shorter time than said operating cam sleeve, and means actuated during rotation of the controlling cam sleeve for releasing said operating cam sleeve.

4. In a transmitting or selecting mechanism for start-stop telegraph apparatus, a common driving shaft, an operating cam sleeve, a clutch therefor, a stationary pivoted arm engageable with said clutch at each revolution, an independent controlling cam sleeve and an independent clutch therefor, a stationary pivoted controlling arm engageable with said independent clutch at each half-revolution, and cam means on said independent controlling cam sleeve effecting the actuation of the first said stationary pivoted arm during rotation.

5. In a start-stop signal transmitter, signal transmitting cam means, clutch driving means therefor, independent controlling cam means, yielding friction clutch driving means, means for controlling the rotation of said independent controlling cam means by said friction clutch, and means operable during rotation of the controlling cam means for controlling the rotation of said signalling cam means.

6. In a start-stop signal transmitter, signal transmitting cam means, clutch driving means therefor, controlling cam means having independent clutch driving means, a controlling arm for releasing said independent clutch means for rotation from one position to another, means operable during said rotation for releasing said signal transmitting means for rotation from one position to another, and means operable during rotation of said signal transmitting means for intercepting the rotation of said independent clutch means.

7. In a start-stop keyboard controlled signal transmitter, signal transmitting cam means and clutch driving means, independent controlling cam means and yielding friction clutch means, a controlling arm for releasing said yielding friction clutch for a half revolution at each actuation, means operable during said half revolution for releasing said signal transmitting means, and means operable to a position to arrest further rotation of said independent controlling cam means by said signal transmitting cam means until completion of rotation thereof.

8. In a start-stop keyboard controlled transmitter, signal transmitting cam means and clutch driving means, and controlling cam means having independent clutch driving means, a controlling arm for releasing said independent clutch means for rotation from one position to another, means operable by said controlling cam means after a predetermined portion of a revolution for releasing said signal transmitting cam means for rotation from one position to another, a locking arm operable on commencement of rotation of said controlling cam means for locking the keyboard, and means operable by said signal transmitting means for intercepting any further subsequent rotation of said controlling cam means in said predetermined portion of a revolution and after the operation of said locking arm.

9. In a start-stop keyboard controlled transmitter, a signal transmitting cam sleeve, clutch driving means, a controlling cam sleeve and independent yielding friction clutch means, a controlling arm for releasing said controlling cam sleeve for a half revolution at each actuation, a locking arm actuated on commencement of rotation in each said half revolution, means subsequently operable at a predetermined portion in each said half-revolution for releasing said signal transmitting cam sleeve for rotation from one position to another and means operable to a position to arrest any subsequent rotation of said independent cam sleeve at an intermediate position in each half revolution by said signal transmitting cam sleeve until said other position thereof is reached.

10. In a selecting mechanism for a start-stop telegraph receiver operating cam means, a driving clutch, independent controlling cam means and clutch individual thereto, a member operable from one to the other of two positions in accordance with successive elements of a received signal means operable in response to the first movement to one of said positions in response to a received signal to release said controlling cam means for rotation from one position to another and means operable during said rotation to release said operating cam means for rotation in synchronism with the succeeding elements of a received signal.

11. In a selecting mechanism for a start-stop telegraph receiver, a driving shaft, an operating cam sleeve, a one-revolution clutch means for driving said sleeve from said shaft, a controlling cam sleeve having an independent one-revolution clutch means, means actuated thereby at a predetermined portion of each revolution to release the first said one-revolution clutch means, and a member responsive to the elements of received signals releasing said independent one-revolution clutch means on receipt of a start element of each received signal combination and thereafter controlling the operation of said selecting mechanism.

12. In a selecting mechanism for a start-stop telegraph receiver, operating in response to a signal code in which a series of permutation elements follow an invariable start element, an operating cam sleeve having the first of a series of selecting cams brought to the operative position as soon as possible after commencement of rotation of said cam sleeve, a driving clutch adapted to rotate said sleeve through a predetermined angle for each signal combination, a separate cam sleeve released for rotation through a predetermined angle in response to a start element of each signal combination, and means operable after a predetermined portion of said rotation of the separate cam sleeve for releasing the driving clutch of said operating cam sleeve.

13. In a telegraph system, a signal transmitter, comprising signalling contact means, signal controlling means, and means operable once for each signal combination to actuate said signalling contact means invariably in opposite directions and then variably in accordance with said signal controlling means.

14. In a telegraph system, a signal transmitter having means to transmit signal combinations, each composed of two invariable elements of opposite characters followed by a series of permutation elements, and a signal receiver having actuating means released for operation in response to the second of said invariable elements.

15. In a start-stop telegraph transmitter, an operating cam sleeve clutch means for rotating said sleeve for a predetermined amount for each signal combination, a signalling contact lever, and means intermediate said sleeve and said contact lever to actuate the latter invariably to one and then another position on commencement of each movement of said sleeve and thereafter variably to one or the other position.

16. In a start-stop keyboard controlled signal transmitter, signalling contact means, cam means for actuating said contact means in accordance with the elements of appropriate case signals, other cam means for actuating said contact means variably in accordance with character signals, and cams on each of said cam means actuating said contact means invariably on commencement of rotation for sending a stop and a start element of opposite character.

17. In a start-stop keyboard controlled signal transmitter signalling contact means, a first cam sleeve cooperable with said contact means, a second cam sleeve co-operable with said contact means, and cams on both of said sleeve for invariably actuating said contact means in opposite directions on commencement of rotation.

18. In a start-stop keyboard controlled transmitter, signalling contact means separate operating cam means and case signal cam means each adapted on commencement of operation to actuate said contact means in opposite directions, independent controlling cam means effecting the release of said operating cam means after a predetermined portion of a revolution, and means operable on release of either of said operating cam means or case signal cam means for arresting any subsequent rotation of said controlling cam means in said predetermined portion of a revolution.

19. In a start-stop keyboard controlled transmitter, signalling contact means, a first cam sleeve co-operable with said contact means, a second cam sleeve also cooperable with said contact means, cams on both of said sleeves for invariably actuating said contact means in opposite directions on commencement of rotation, an independent controlling cam sleeve, intercepting means therefor controlled by said first and second cam sleeves, and signal transfer means actuated by said independent controlling cam sleeve.

20. In a keyboard controlled telegraph transmitter, a controlling cam means released on depression of any key lever in said keyboard, a separate operating cam means released by said controlling cam means after a predetermined interval, and signalling means actuated by said operating cam means for transmitting an invariable start element followed by a series of permutation elements.

RONALD GEORGE GRIFFITH.